A. J. MOTTLAU.
COASTER BRAKE.
APPLICATION FILED JUNE 24, 1921.
1,398,883.
Patented Nov. 29, 1921.
2 SHEETS—SHEET 1.
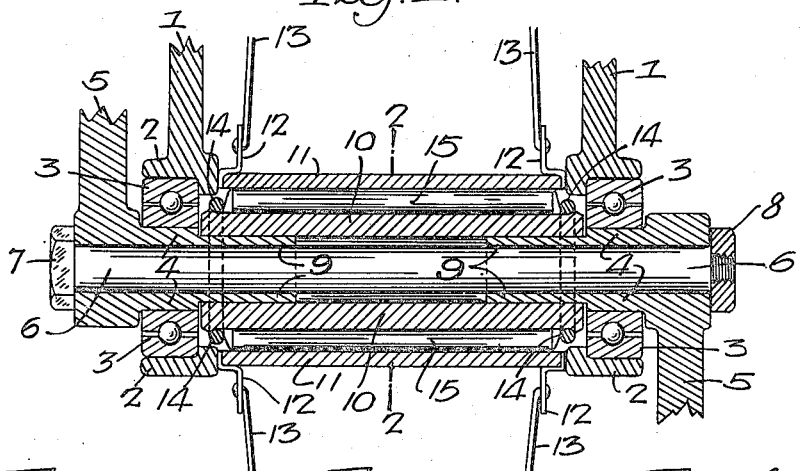
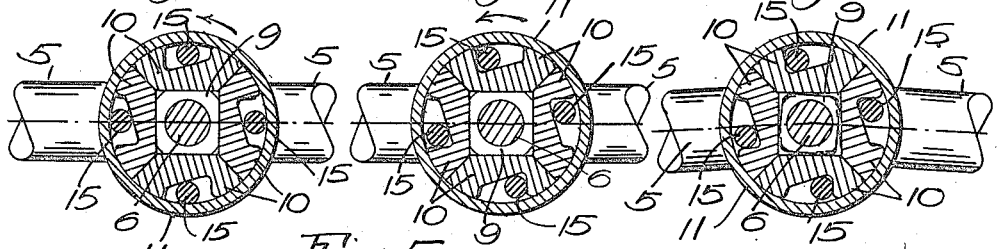
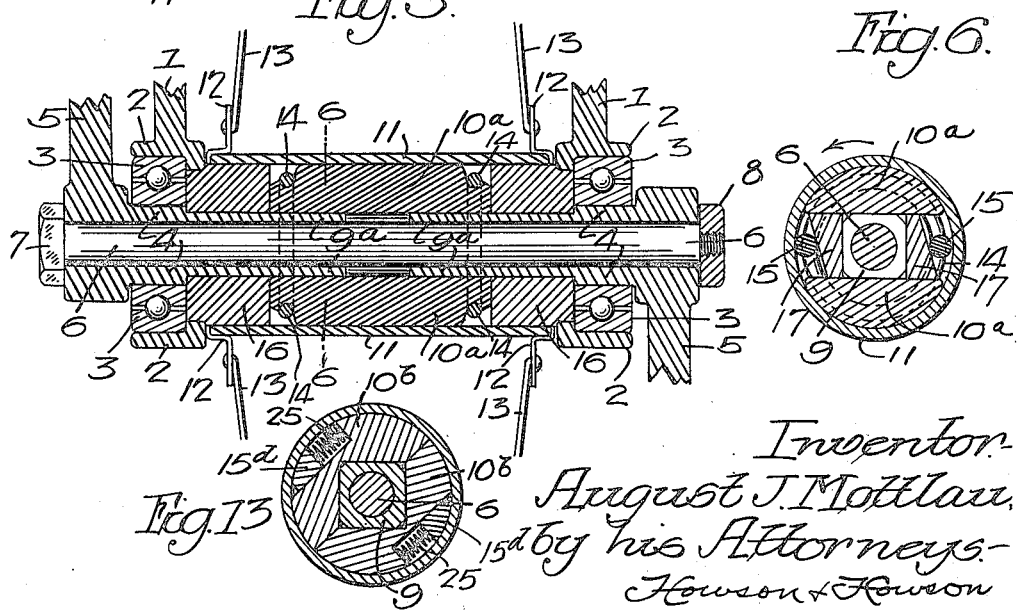
Inventor-
August J. Mottlau,
by his Attorneys-
Howson & Howson

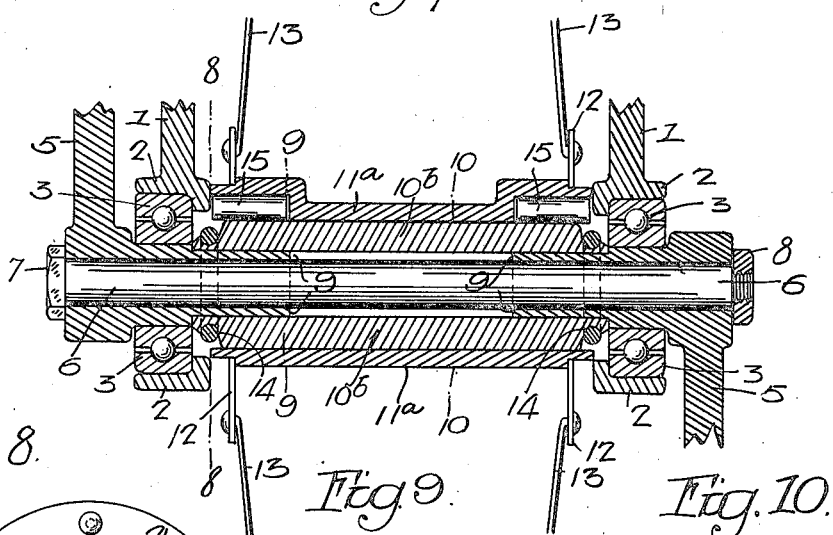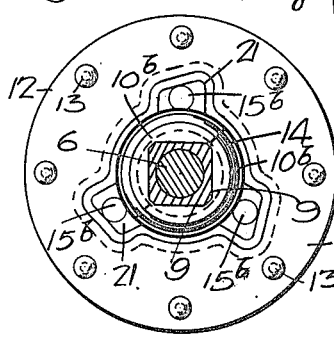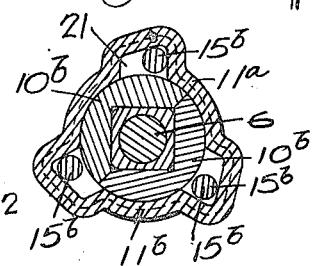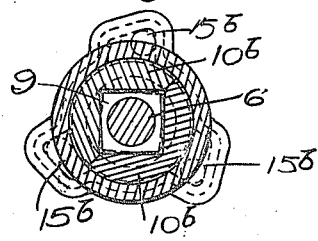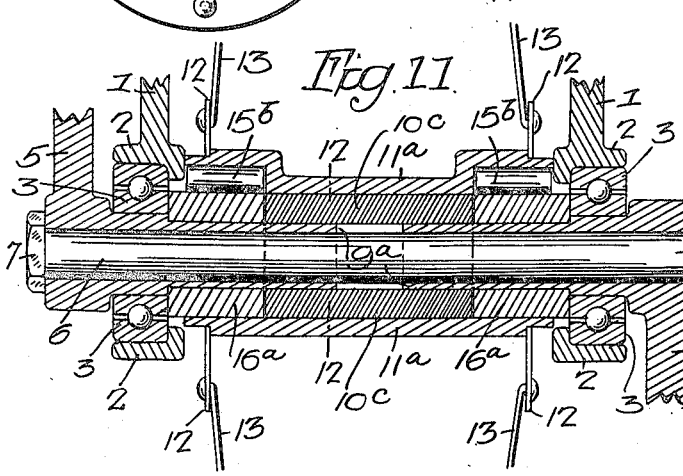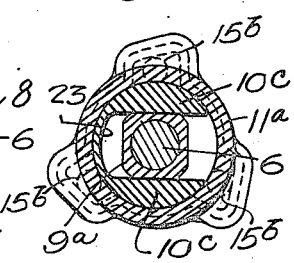

UNITED STATES PATENT OFFICE.

AUGUST J. MOTTLAU, OF PHILADELPHIA, PENNSYLVANIA, ASSIGNOR TO A. MECKY COMPANY, OF PHILADELPHIA, PENNSYLVANIA, A CORPORATION OF PENNSYLVANIA.

COASTER-BRAKE.

1,398,883.          Specification of Letters Patent.         Patented Nov. 29, 1921.

Application filed June 24, 1921. Serial No. 480,145.

*To all whom it may concern:*

Be it known that I, AUGUST J. MOTTLAU, a subject of the King of Denmark, having declared my intention of becoming a citizen of the United States, residing in Philadelphia, Pennsylvania, have invented a Coaster-Brake, of which the following is a specification.

One object of my invention is to provide a relatively simple, inexpensive and substantial device particularly designed for use on vehicles such as bicycles, velocipedes, toy wagons or the like, which shall permit the driven member or members of said vehicle being forwardly propelled, shall allow it to drift or coast independently of the pedals or other driving elements, or shall allow of the application to it of a braking force.

Another object of my invention is to provide a novel form of coaster attachment for velocipedes, bicycles or the like which shall be convenient and inexpensive to assemble, shall not be likely to get out of order or require expert attention or adjustment, and which may be easily operated either to permit of coasting, braking, back or forward pedaling at will.

These objects and other advantageous ends I attain as hereinafter set forth, reference being had to the accompanying drawings, in which, Figure 1 is a longitudinal vertical section showing my invention as applied to the driving wheel of a velocipede;

Fig. 2, 3 and 4 are transverse vertical sections on the line 2—2, Fig. 1, showing the parts in the positions occupied, first when power is being transmitted to drive the wheel, second when the wheel is coasting, and third when the wheel is being braked;

Fig. 5 is a longitudinal section of a modified form of my invention;

Fig. 6 is a vertical section on the line 6—6, Fig. 5;

Fig. 7 is a longitudinal section of a second modification of my invention;

Figs. 8, 9 and 10 are transverse sections on the lines 8—8, 9—9 and 10—10, Fig. 7;

Fig. 11 is a longitudinal section of a third modification of the invention;

Fig. 12 is a transverse section on the line 12—12, Fig. 11; and

Fig. 13 is a transverse section of a coaster brake illustrating the use of wedges in place of rollers in the clutch.

In the above drawings, 1—1 represent the branches of the fork of a velocipede having annular end portions 2 in which are mounted ball bearings 3 for the reception of the cylindrical portions of the tubular spindles 4, which have their outer ends integral with pedal cranks 5. Said tubular spindles are connected and held in place by a bolt 6 extending longitudinally through them and through the cranks 5, which bolt has on one end a head 7 and on its opposite end a nut 8, although obviously it may be otherwise constructed.

The adjacent ends 9 of the crank spindles are externally squared and serve to support a series of segmental shoes 10, in the present instance four, whose outer surfaces are cylindrically curved to fit within and substantially fill the cylindrical hub sleeeve 11, which is rotatably mounted upon them. This sleeve has fixed to its ends, integrally or otherwise, flanges 12 for the attachment of the spokes 13 whose outer ends are connected in any suitable manner to the rim of a wheel, not shown.

In the present instance the shoes 10 have radially disposed engaging faces and also flat faces for engagement with the flat sides of the square ends 9 of the crank spindles;— there being at each end of the shoes a spring ring 14 whereby all of them are held together and caused to tend to return to positions with their flat faces in engagement with the flat faces of the spindle ends as shown in Figs. 2 and 3. Each of the shoes is preferably formed with a longitudinally extending recess or depression in its cylindrically curved face for the reception of a clutch roller 15, and the bottoms of these recesses are inclined at an acute angle to the adjacent inner surface of the hub sleeve so that when the shoes are turned in one direction all of the rollers are caused to frictionally grip or connect them with the hub sleeve.

It is to be understood that the various parts are so assembled that while the crank spindles are kept from longitudinal movement on the bolt 6, they may none the less be independently turned thereon to a limited extent.

With the above described arrangement of parts if the cranks 5 be turned in a counter-clockwise direction, as indicated by the arrow in Fig. 2, the shoes 10 on the squared ends 9 of the spindles 4 are necessarily turned with them and at once one or more of the rollers 15 acts to frictionally connect said shoes to the hub sleeve 11. These rollers 15 may be in one piece for each groove or be in several short sections. The sleeve 11 with the wheel attached thereto is thus turned and the vehicle of which it forms a part is driven in a forward direction.

If the force applied to rotate the cranks 5 be removed, the wheel is free to turn independently of the cranks 5 and shoes 10, since the rollers 15 move into the inoperative positions shown in Fig. 3, thereby permitting the vehicle to coast. If now one of the pedals be angularly rotated relatively to the other, as would occur for example if one of them was held and the other pressed backwardly, there is a relative angular displacement of the squared ends 9 of the tubular crank spindles (Fig. 4) which forces outwardly the shoes 10 and causes them to exert a frictional retarding force on the rotation of the hub sleeve 11, which may obviously be varied by varying the force tending to turn one of the pedals relatively to the other. The forward motion of the wheel, and hence of the vehicle of which it forms a part, is thus retarded and this braking action may be stopped by again allowing the pedals and hence the shoes 10 to resume their normal positions under the action of the spring rings 14. The wheel may now be braked on the one hand or on the other hand turned in a forward direction as desired.

As shown in Figs. 5 and 6, I may mount within each end of the hub sleeve 11 a solid bearing piece or ball bearing 16, carrying these on portions of the crank spindles. Between said bearings I mount a pair of oppositely disposed shoes 10ª, each of which has a cylindrically curved outer surface and a flat inner face normally in engagement with opposite flat faces of the squared spindle ends 9ª. Between these two shoes and lying in engagement with the second pair of opposite flat faces of the spindle ends are two wedge shaped plates 17, whose inclined outer faces coact with the clutching rollers 15 to connect the cranks with the hub sleeve as before described.

The ends of the shoes 10ª are preferably reduced in diameter and provided with grooves for the reception of spring rings 14 having the same function as those of the construction shown in Fig. 1. As in this form of my invention, the rollers 15 serve to clutch the cranks and their associated rotary members to the hub sleeve and hence to the balance of the wheel when said cranks are turned in a counterclockwise direction. If the wheel with the hub sleeve be allowed to continue turning while both cranks are held from rotation, the clutch rollers automatically release to permit coasting and if one of the cranks be held while the other is turned relatively to it, the shoes 10ª are forced apart into frictional engagement with the internal surface of the hub sleeve, serving as a brake as before.

In these as well as in the other forms of my invention, I may, as illustrated in Fig. 13, substitute for the rollers 15 spring actuated wedges 15ª carried in suitable recesses of the shoes and normally acted on by springs 20 so that they serve to clutch together said shoes and the hub sleeve when the former are turned in a counterclockwise direction. When turned in the opposite direction they permit these parts to be rotated independently.

In the construction shown in Figs. 7 to 10 inclusive I form recesses 21 in the inner surface of the hub sleeve 11ª, placing in said recesses clutch rollers 15ᵇ so that these will act upon the cylindrical external surface of a pair of clutch shoes 10ᵇ, rotatably mounted within said clutch sleeve and normally held together by spring rings 14 mounted in annular recesses in their reduced end portions.

The cylindrical body formed by the two shoes 10ᵇ has through it a passage of rectangular section designed to receive the squared ends 9 of the tubular crank spindle so that as before the relative rotation of said spindles will force the two shoes into braking engagement with the inner surface of the hub sleeve, while their rotation in a counterclockwise direction will cause the rollers to be moved into gripping engagement with said hub sleeve and said shoe. In this case I may make the rollers of relatively short length instead of having them extend completely across the hub sleeve as in Fig. 1.

Where in Fig. 1 I have illustrated a construction employing four brake shoes and in Figs. 5 and 7 constructions utilizing two such shoes, I may in some cases make the braking device of but a single part, as illustrated in Figs. 11 and 12. In this case I provide bearing pieces 16ª on each of the squared portions of the crank spindles and cause the clutch rollers 15ᵇ to act between their external surfaces and the inclined surfaces of recesses formed in the hub sleeve 11ª. Between these hub pieces I mount the single brake member 10ᶜ which consists of a cylindrical body of steel or other suitable material longitudinally slotted to provide a parallel-sided recess for engagement with opposite sides of the squared spindle ends 9ª. There is thus left a relatively thin wall 23 connecting the two main shoe portions of this member and serving as a spring to normally maintain them with their flat faces in engagement with the squared parts of the crank spindles. When however, the latter are relatively turned as by holding one of the cranks while the other is pressed backwardly, the two sections or shoes of the body of the member 10° are forced apart into braking engagement with the interior surface of the hub sleeve. These parts are free to resume their original positions when the braking force is removed.

In all the above forms of my invention it is particularly to be noted that the various parts are of durable and substantial construction and capable of being easily and quickly assembled, while the device as a whole may be made with a mimimum cost. At the same time the construction is simple and certain in its action and of such a nature that under conditions of use there is but little likehood of its getting out of repair or requiring attention.

I claim:

1. The combination of cranks respectively having integral tubular spindles formed with portions of other than circular section; brake shoes actuated by said portions of the spindles; a bolt extending through the crank spindles and permitting their relative rotation; a sleeve inclosing the brake shoes; and clutching means for operatively connecting the cranks and the sleeve.

2. The combination of cranks having integral tubular spindles formed with squared ends; a bolt extending through said spindles and permitting their relative rotation; a sleeve; shoes within said sleeve and movable into braking engagement therewith by the squared portions of said crank spindles; and clutching means for causing power to be transmitted between the sleeve and the crank spindles.

3. The combination of a sleeve; cranks having integral tubular spindles and relatively rotatable to a limited extent; with coaster-, braking-, and clutching mechanism operatively interposed between said spindles and the sleeve, said spindles having portions of other than circular section for causing operation of the braking mechanism when the cranks are relatively rotated.

4. The combination with the forked branches of a vehicle of cranks having integral tubular spindles journaled in said branches and having portions of other than circular section; brake shoes mounted on said portions of the spindle; a sleeve surrounding said shoes in position to be frictionally engaged thereby when the spindles are turned relatively to each other; and a clutch device for causing power to be transmitted from the cranks to the sleeve when said cranks are turned in one direction.

5. The combination with the forked branches of a vehicle of cranks having structurally independent spindle portions journaled in said branches; a sleeve; brake shoes actuated by relative rotation of said crank spindles for exerting a braking force on the sleeve; and springs means for normally holding said brake shoes in predetermined relation with the spindles.

6. The combination with the forked branches of a vehicle of cranks having integral tubular spindles mounted in said branches and formed with squared ends; a bolt extending through said spindles and permitting of their limited relative rotation; a sleeve; and shoes mounted within said sleeves upon the squared portions of the spindles and expansible thereby into frictional engagement with the sleeve.

7. The combination of cranks having spindles formed with portions of other than circular section; relatively rotatable brake shoes mounted on said portions of the spindles and having longitudinally extending recesses in their outer surfaces; a sleeve inclosing said brake shoes; and rollers in said recesses for clutching the shoes to the sleeve when they are turned in one direction, said shoes being positioned to frictionally engage said sleeve when expanded by relative rotation of the crank spindles.

8. The combination with the forked branches of a vehicle; bearings in said branches; cranks having integral tubular spindles journaled in said bearings and each formed with a polygonal portion; a bolt extending through said crank spindles and permitting of their relative rotation; a set of brake shoes mounted on polygonal portions of the spindles; springs tending to retain said shoes in engagement with the spindles; a sleeve inclosing the brake shoes; and clutching members operative between the spindle and the brake shoes for operatively connecting them when the cranks are turned in one direction.

9. The combination with a sleeve of cranks having integral spindles; a bolt extending through said spindles and permitting of their angular displacement; with radially movable brake shoes actuated by such angular displacement of the cranks and operative on the inner surface of the sleeve.

AUGUST J. MOTTLAU.